US010380734B2

(12) United States Patent
Parikh et al.

(10) Patent No.: US 10,380,734 B2
(45) Date of Patent: Aug. 13, 2019

(54) SYSTEM, METHOD AND COMPUTER PROGRAM PRODUCT FOR SECURITY ANALYSIS OF JEWELRY ITEMS

(71) Applicants: Aniket Bharat Parikh, Scarsdale, NY (US); Archana Aniket Parikh, Scarsdale, NY (US)

(72) Inventors: Aniket Bharat Parikh, Scarsdale, NY (US); Archana Aniket Parikh, Scarsdale, NY (US)

( * ) Notice: Subject to any disclaimer, the term of this patent is extended or adjusted under 35 U.S.C. 154(b) by 101 days.

(21) Appl. No.: 15/442,797

(22) Filed: Feb. 27, 2017

(65) Prior Publication Data

US 2018/0247399 A1 Aug. 30, 2018

(51) Int. Cl.
*G06K 9/52* (2006.01)
*G06Q 30/06* (2012.01)
*G06Q 30/02* (2012.01)
*G06K 9/62* (2006.01)
(Continued)

(52) U.S. Cl.
CPC ............. *G06T 7/001* (2013.01); *G06K 9/52* (2013.01); *G06K 9/6203* (2013.01); *G06K 9/6215* (2013.01); *G06Q 30/0283* (2013.01); *G06Q 30/0629* (2013.01); *G06T 7/0002* (2013.01); *G06T 7/74* (2017.01); *G06T 2207/30108* (2013.01)

(58) Field of Classification Search
CPC .......... G06T 7/0002; G06T 7/74; G06K 9/52; G06K 9/6215; G06Q 30/0283; G06Q 30/0629
USPC ....................................................... 348/152
See application file for complete search history.

(56) References Cited

U.S. PATENT DOCUMENTS 6,980,283 B1 * 12/2005 Aggarwal .............. G01N 21/87
356/30
7,251,619 B2 7/2007 Holloway
7,571,060 B2 8/2009 Blodgett et al.
(Continued)

FOREIGN PATENT DOCUMENTS

CA 2848106 A1 10/2014
CN 202407384 9/2012
(Continued)

OTHER PUBLICATIONS

We Buy Jewellery—Online Web Portal, we-buy-jewellery.com, last accessed on Apr. 28, 2017.
(Continued)

*Primary Examiner* — Farzana Hossain
(74) *Attorney, Agent, or Firm* — Leason Ellis LLP

(57) ABSTRACT

Method, system and computer program product for verification of jewelry items through comparison of images captured at different time intervals. The captured images show the images of gem holders which enable one or more gemstones to be held on the jewelry item. The images are stored in a database and compared to verify a change in the settings of the gem holders. A change in the metal part or the gemstones is detected based on the change in the settings of the gem holders and/or the difference of images. The valuation of the jewelry is determined to be changed on the basis of change in the metal part or the gemstones. The invention further allows displaying, evaluating, comparing and selling the jewelry item through an online commerce platform connected to the database.

37 Claims, 13 Drawing Sheets

(51) Int. Cl.
*G06T 7/00* (2017.01)
*G06T 7/73* (2017.01)

(56) References Cited

U.S. PATENT DOCUMENTS

| | | | |
|---|---|---|---|
| 8,095,325 B2 | 1/2012 | Blodgett et al. | |
| 2001/0024532 A1 | 9/2001 | Malnckoif | |
| 2004/0032328 A1 | 2/2004 | Rubinstein | |
| 2005/0246239 A1* | 11/2005 | Yeko, Sr. | G06Q 30/0613 |
| | | | 705/26.41 |
| 2006/0117011 A1* | 6/2006 | Arbel | G06F 17/30286 |
| 2009/0245623 A1 | 10/2009 | Nasser | |
| 2011/0228063 A1* | 9/2011 | Smith | G01N 21/87 |
| | | | 348/61 |
| 2013/0321792 A1 | 12/2013 | Shapiro | |
| 2014/0052563 A1* | 2/2014 | Watkins | G06Q 30/0621 |
| | | | 705/26.5 |
| 2014/0297368 A1 | 10/2014 | Ferder | |
| 2014/0312017 A1 | 10/2014 | Potemkin et al. | |
| 2016/0167164 A9 | 6/2016 | Rosario et al. | |
| 2016/0232432 A1* | 8/2016 | Regev | G02B 21/0028 |
| 2017/0041328 A1 | 2/2017 | Stack et al. | |
| 2017/0255651 A1* | 9/2017 | Shintani | G06Q 10/087 |

FOREIGN PATENT DOCUMENTS

| | | |
|---|---|---|
| KR | 101145293 | 5/2013 |
| KR | 101249537 | 5/2013 |
| WO | 2008045613 A3 | 4/2008 |
| WO | 2015023230 A1 | 2/2015 |

OTHER PUBLICATIONS

Diamond Whisperer—Online Web Portal, www.diamondwhisperer.com, last accessed on Apr. 28, 2017.

\* cited by examiner

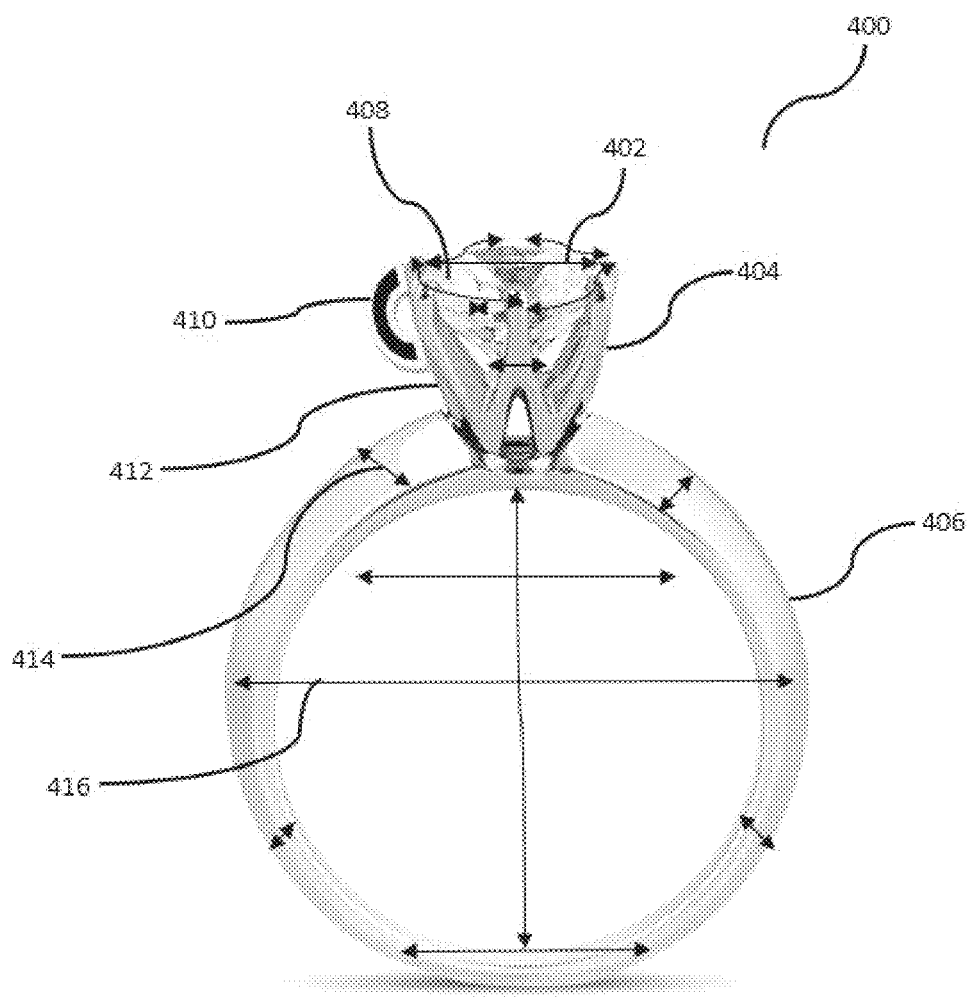
Figure — 4

August 03, 2016
Report Type .................................................. Grading Report
GIA Report Number .................................. 5172771944
Shape and Cutting Style ......................... Round Brilliant
Measurements ................................ 6.36 - 6.39 x 4.13 mm Carat Weight .................................................. 1.07 carat
Color Grade .............................................. Very Light Gray
Color Origin ........................................................ Natural
Color Distribution ........................................ Not Applicable
Clarity Grade ............................................................ SI2
Proportions:

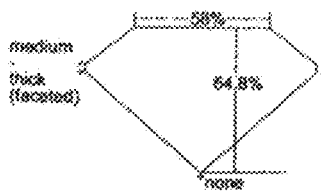

Profile not to actual proportions

Polish .............................................................. Very Good
Symmetry ............................................................ Excellent
Fluorescence ............................................................ None
Comments: Additional clouds, pinpoints and surface
graining are not shown.

Figure – 5

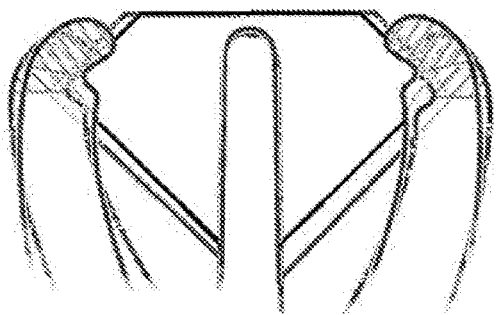
Figure – 7c
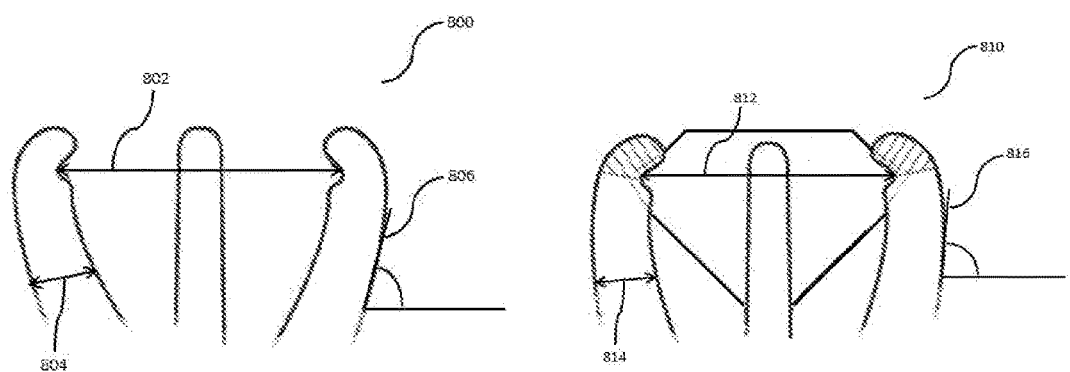
Figure – 8a
Figure – 8b

SYSTEM, METHOD AND COMPUTER PROGRAM PRODUCT FOR SECURITY ANALYSIS OF JEWELRY ITEMS

FIELD OF THE INVENTION

The invention relates to security aspect of jewelry items, and in particular to security analysis of jewelry items through image comparison.

BACKGROUND OF THE INVENTION

High-valued articles like jewelry and diamond are susceptible for steal and fraud. These items can be protected from steal through safety measures, however, fraud prevention is a complex task as the quality and value of such items can only be determined by trained experts. Even a small difference in the quality of precious metals or diamonds can create a big difference in its value. For example, many gemstones can appear to have the same cut, color, shape and size. So, when a gemstone is given to a jeweler for repair or assessment, there is a chance that it can be swapped with a lower value gemstone having same appearance without the knowledge of customer.

Various measures have been developed to detect the purity and originality of these precious articles and to estimate its real value. Apart from the conventional in-hand analysis of an expert jeweler, Software algorithms have been developed for automation of the task to some extent. The Software use imaging technology to photograph jewelry items at different time intervals and compare the photographs through intelligent algorithms to detect any changes. The Software analyzes the jewelry items by tracking size of stones, table facets, angles, inclusions in gemstones, etc. The laser inscriptions and identification markings, invisible to naked eye, are also used for determining the authenticity. Furthermore, RFID tags are also embedded and hidden inside the jewelry items for the purpose. The Software algorithms use these parameters for determining the originality and genuineness of these precious articles.

US patent application US20140312017A1 describes a system and method for determining authenticity of precious stones (cut diamonds and uncut diamonds) by applying laser marking on the surface of the article. The article surface is irradiated with laser lights of different wavelengths and interference images are stored. The stored data is compared to authenticity-checking interference images to determine the authenticity of the identification marking.

WIPO patent application WO2015023230A1 describes a method and system for certifying and verifying gemstones by capturing image of an inclusion in the gemstone. The image is displayed on a certification document which can be compared to the gemstone viewed through an optical device to determine if the gemstone matches the image. The certification document may also contain additional physical identification data like location of the inclusion using an x, y, z axis, gemstone's appearance, shape, size, weight, measurements, color, refractive index, specific gravity and absorption spectrum.

U.S. Pat. No. 9,373,011 describes system and method for identification and authentication of precious metals and small jewelry items using radio frequency identification ("RFID") technology. The RFID tag can be embedded in absorbing dielectric medium inside epoxy in a tiny cavity placed in the metal or jewelry. The RFID tag information can be transferred to a computer through the reader, and can be matched with preprogrammed information in a database.

Every piece of jewelry having a gemstone has a set of "gem holders", commonly known as prongs, which hold the gemstone in place. Prongs are basically small metal rods, part of the jewelry that is bent over to cover a gem and hold it in place. The primary reason why prong settings are preferred by many consumers is that they offer good security while still enabling light to enter the diamond for better brilliance. Besides that, prongs can also be easily modified to higher (makes diamond look larger) or lower positions (doesn't catch onto things easily) depending on person's choice. In addition to prongs, the gem holders setting in the jewelry item can be of various types like bezel, channel set, etc.

The prong setting used for holding the gemstone is an important aspect for determining any changes done to jewelry item or gemstone by the jeweler during repair or assessment. The current technology does not cater to using prong setting for the purpose.

SUMMARY OF THE INVENTION

The present invention describes a novel methodology of verifying a jewelry item having a gemstone by comparing the images of gem holders' settings captured at different time intervals. A change in the metal part or the gemstones is verified based on the change in the gem holders' settings. Eventually, the change in valuation of the jewelry item is determined based on the change in the metal part or the gemstones.

One aspect of the present invention describes a method for verification of a jewelry item. The method includes capturing a first set of images of the jewelry item at first time interval, wherein the first set of images captures an image of one or more gem holders which hold the gemstones on the jewelry item. The method also includes capturing a second set of images of the jewelry item at second time interval, wherein the second set of images captures the image of the gem holders. The method further includes comparing the first and the second set of images to verify a change in a setting of the gem holders.

An alternative aspect of the present invention describes a method for verifying a change in the valuation of a jewelry item. The method includes capturing a first set of images of the jewelry item at first time interval, wherein the first set of images captures an image of one or more gem holders which hold the gemstones on the jewelry item. The method also includes capturing a second set of images of the jewelry item at second time interval, wherein the second set of images captures the image of the gem holders. The captured images are stored in a database. The method further includes comparing the first and the second set of images to verify a change in a setting of the gem holders and verifying a change in a metal part or the gemstones of the jewelry item based on the change in the setting of the gem holders. The method also includes verifying a change in a valuation of the jewelry item based on the change in the metal part or the gemstones.

One more aspect of the present invention describes a system for verification of a jewelry item. The system includes an image capturing device for capturing a first set of images and a second set of images of the jewelry item at first and second time interval, respectively, wherein the first and the second set of images captures an image of one or more gem holders which hold the gemstones on the jewelry item. The system also includes a database for storing the first and the second set of images. The system further includes a processing unit for comparing the first and the second set of images to verify a change in a setting of the gem holders. The system also includes an output display for displaying the first and second set of images and results of comparison of the images.

A further aspect of the present invention describes a non-transitory computer-readable storage medium, having stored there on a computer program for verification of a jewelry item, the computer program having a plurality of code sections. The code sections are executable by a computer to cause the computer to perform the steps of receiving a first set of images of the jewelry item at first time interval, wherein the first set of images includes an image of one or more gem holders which hold the gemstones on the jewelry item. The code sections also perform the steps of receiving a second set of images of the jewelry item at second time interval, wherein the second set of images includes the image of the gem holders. The code sections further perform the steps of comparing the first and the second set of images to verify a change in a setting of the gem holders.

BRIEF DESCRIPTION OF THE DRAWINGS

FIG. 4 illustrates the image of the jewelry item having a gemstone;

FIG. 5 illustrates an exemplary diamond report of Gemological Institute of America;

FIG. 7c shows the superimposed image of FIG. 7a and FIG. 7b;

FIG. 8a illustrates a line diagram of the jewelry item with gemstone removed from the prongs at time interval T1;

FIG. 8b illustrates a line diagram of the jewelry item at time interval T2 after the gemstone is set between the prongs;

Figure 1:
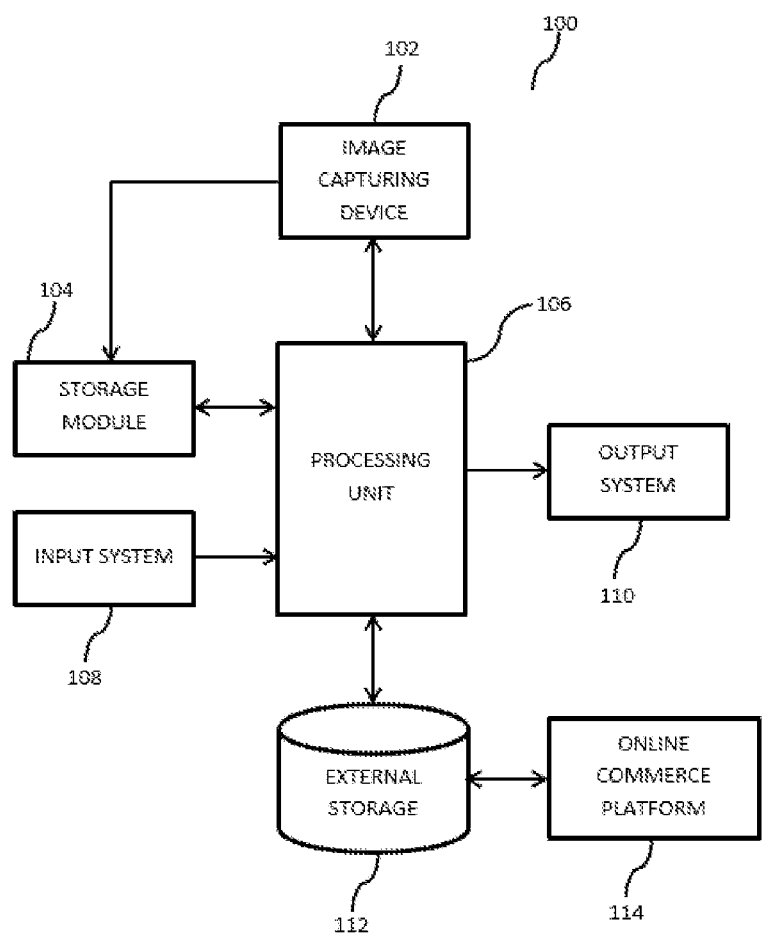
FIG. 1 illustrates a block diagram of a system embodying the teachings of the present invention.

While the disclosed subject matter is amenable to various modifications and alternative forms, specifics thereof have been shown by way of example in the drawings and will be described in detail. It should be understood, however, that the intention is not to limit aspects of the invention to the particular embodiments described. The intention is to cover all modifications, equivalents, and alternatives falling within the spirit and scope of the invention.

DETAILED DESCRIPTION

The following detailed description is made with reference to the figures. Exemplary embodiments are described to illustrate the subject matter of the disclosure, not to limit its scope, which is defined by the claims. Those skilled in the art will recognize that the various elements described and/or shown may be arranged in various combinations and configurations without departing from the scope of the disclosure.

All numbers or values are herein assumed to be modified by the term "about." The disclosure of numerical ranges by endpoints includes all numbers subsumed within that range (e.g., 1 to 5 includes 1, 1.5, 2, 2.75, 3, 3.80, 4, and 5).

As used in this specification and the appended claims, the singular indefinite articles "a", "an", and the definite article "the" should be considered to include or otherwise cover both single and plural referents unless the content clearly dictates otherwise. In other words, these articles are applicable to one or more referents. As used in this specification and the appended claims, the term "or" is generally employed to include or otherwise cover "and/or" unless the content clearly dictates otherwise.

FIG. 1 illustrates a block diagram of a system 100 embodying the teachings of the present invention. The system 100 includes an image capturing device 102 for capturing multiple images of a jewelry item. The image capturing device 102 takes images from various angles of the jewelry item including the gemstones, metal parts and the prongs. The physical characteristics of the jewelry item including the appearance, shape, size, measurements (length, width and depth) and color are captured through the images. The captured images can be in form of still images, video images or laser based topography model of the jewelry item. Exemplary image capturing device includes an analog or digital still image camera, a video camera, an optical camera, a laser camera, a laser or 3D image scanner, or any other device capable of capturing high resolution images of the jewelry item. The image capturing device 102 can also be a high definition inbuilt camera of a communication device such as a computer, a laptop or a mobile phone.

In an exemplary embodiment, the image capturing device can take multiple images of the jewelry item and stitch the images to get a 360° view. Alternatively, the 360° view can be captured using the panoramic view technology of the image capturing device 102. In a further alternative embodiment, the video image of the jewelry item is captured and still images are extracted from the video frames. FIG. 4 illustrates an image of a jewelry item 400 having a gemstone 402. The image capturing device 102 takes 3D images of the metal part 406, the gemstone 402 and the prongs 404.

The image capturing device 102 also captures the image of inclusions in the gemstone of the jewelry item. Examples of inclusions which may be captured include one or more of solid, liquid or gas inclusions, internal fissures, fractures, zones of crystal growth, stress cracks, bubbles, cleavage fault, feather, halo inclusions, two-phase and three-phase inclusions, etc. The image capturing device 102 further captures identification markings or inscriptions on the surface of the metal part or the gemstone of the jewelry item. Any nicks, scratches, dents, placements, table facets, bottom facets of gemstone, color change under lighting conditions, girdle facets and thickness are also captured through images.

The captured images through image capturing device 102 are stored in a storage module 104. The storage module 104 also stores a time stamp comprising the date and time and a location of capturing and storing the images. The storage module 104 can be an inbuilt storage memory of the image capturing device 102, for example the internal memory of a camera device. In an alternative embodiment, the storage module 104 can be storage memory of one or more of a server computer, a client user computer, a personal computer (PC), a tablet PC, a laptop computer, a desktop computer, a mobile phone, a control system and a network router, switch or bridge. Alternatively, the storage module 104 can be cloud storage of a virtual cloud environment.

The stored images are provided to a processing unit 106 for extracting the information from images and processing it for security analysis of the jewelry item. A user (herein 'user' refers to a jewelry owner, manufacturer, lab person, etc. and will be considered for the description below) can provide additional information of the jewelry item to the processing unit 106 through an input system 108. The additional information can be related to physical characteristics of the metal part and the gemstone like weight, volume, dimensions, carat, cut grade, color rating, etc. The user can also input information relating to price, labor, etc. of the jewelry item. A certificate or lab report of the jewelry item can also be entered manually or uploaded though the input system 108. FIG. 5 shows an exemplary diamond report of Gemological Institute of America. The report shows the physical characteristics of the diamond along with an image. Examples of input system 108 include a keyboard, a touch panel, an electronic or optical mouse, a gesture recognition system and a voice input system. The input system 108 provides the additional information through a user interface of software, a website or a mobile application.

The processing unit 106 extracts information from the jewelry item images captured at different time intervals using a software program and compare the information for detecting any changes in the metal part or gemstones of the jewelry item. The processing unit 106 can be an internal CPU of the image capturing device 102 like a digital camera. In an alternative embodiment of the present invention, the processing unit 106 can be the processing unit of one or more of a server computer, a client user computer, a personal computer (PC), a tablet PC, a laptop computer, a desktop computer, a mobile phone, a control system and a network router, switch or bridge. The processed information from the processing unit 106 is stored in the storage module 104 or an external storage 112.

The processed information of the jewelry item by the processing unit 106 is sent to an output system 110 which displays the information to the user. The output system 110 can display the information pertaining to the physical characteristics of the jewelry item including the appearance, shape, size, volume, weight, measurements (length, width and depth) and color. The information related to inclusions in the gemstones, inscriptions on the metal part and gemstones, nicks, scratches, dents, placements, angles of jewelry and prongs, stone quality, table facets, bottom facets of gem, girdle facets and thickness, weights and or all known and deduced information from the jewelry can be displayed to the user. All the above-mentioned information is extracted from the images of jewelry item taken at different time interval for comparison and reference. The time stamp related to capturing and storing the images are also displayed through the output system 100. In a preferred embodiment of the present invention, the output system 110 also shows the difference in prong settings of the jewelry item, holding the gemstones, before sending it for repairment and after receiving it from repairment. The processing unit 106 calculates the difference in the metal part and the gemstone based on the changes in the prong settings of the jewelry item. The difference in the metal part and the gemstone is also shown to the user as the actual value or a percentage of the difference. The output system 110 can also display an alert or a flag if the difference calculated by the processing unit 106 is more than a predefined threshold limit. The output system 110 can also display the information in form of a certificate including the physical characteristics and images of the jewelry item. The output system 110 can also show the valuation of the jewelry item calculated from the images of different time intervals. The difference in valuation is also shown to the user.

The external storage 112, which can be memory storage of a remote computer, a laptop, a mobile phone, a network router, a switch, a bridge or a virtual space in a cloud environment, is connected to an online commerce platform 114. The online commerce platform 114 enables the user to display the jewelry item, evaluate it by comparing with other similar jewelry items from other websites and sell the jewelry item. The online commerce platform 114 displays the physical characteristics and selling price of the jewelry item. The user can also select and buy or sell jewelry items from the online commerce platform 114 using an appropriate payment method.

Figure 2:
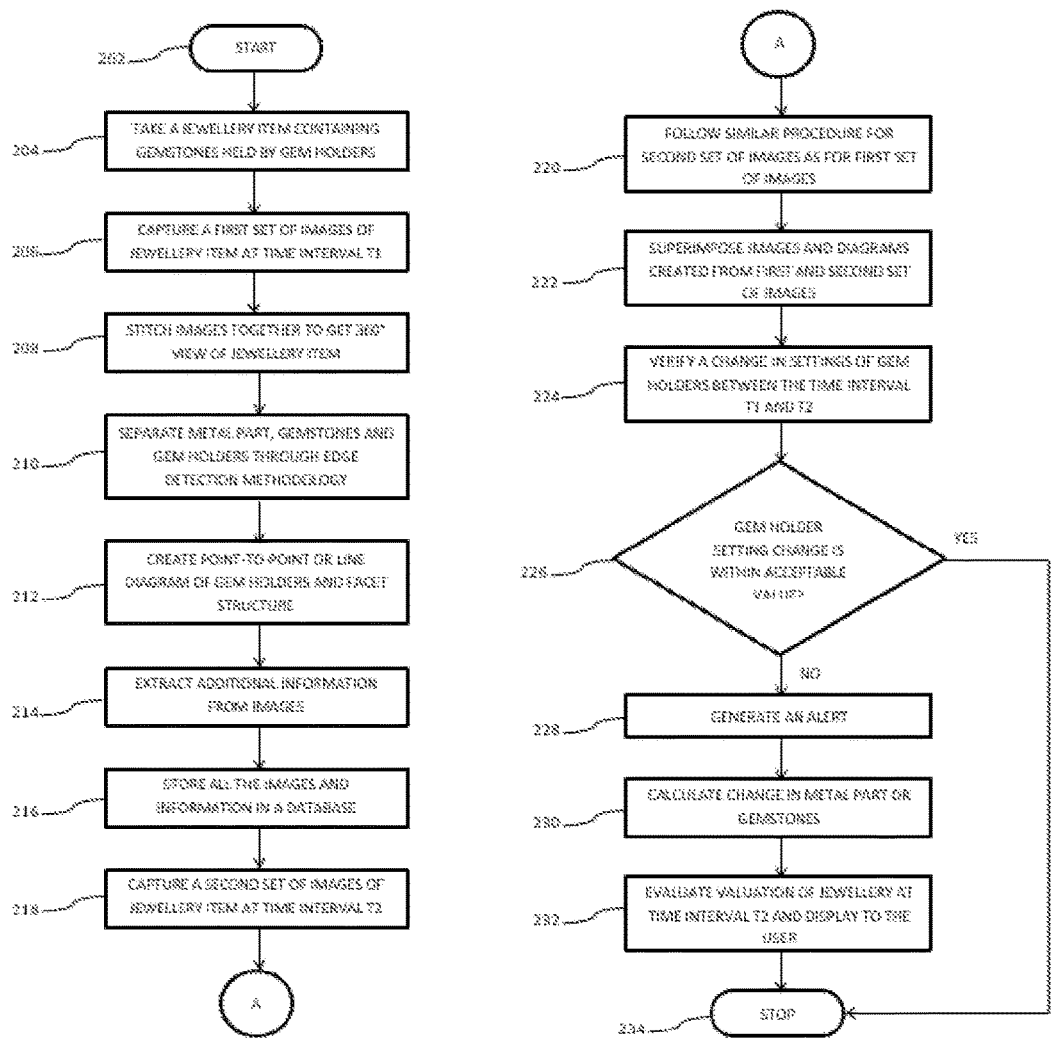
FIG. 2 illustrates a flowchart showing steps in an exemplary method for verification of a jewelry item.

FIG. 2 illustrates a flowchart showing steps for verification of a jewelry item. The process starts at step 202 and a jewelry item containing gemstones held by gem holders (prongs) is taken at step 204. At step 206 the image capturing device 102 takes a first set of images of the jewelry item at time interval T1. In an exemplary embodiment of the present invention, the time interval T1 is considered as the time before the jewelry item is sent to the jeweler for repair. The time T1 can also be any arbitrary time at which the images of jewelry item are taken and stored for reference in future. The images can also be captured at regular intervals by the user to keep a track of the wear and tear in the jewelry item with time. The first set of images includes the images of metal part, gemstones and the prongs of the jewelry item. In case the gemstones are missing or fallen from the jewelry item, the images of empty prongs are also captured. If the user provides the gemstones separately to the jeweler for fitting on the jewelry item, the images of gemstones are also captured for comparison with the jewelry item after it returns from the jeweler. The images are captured at high resolution to enable magnification for easy viewing and comparison. The captured images are stored in the storage module 104.

At step 208, the first set of images are stitched together to get a complete view of the jewelry item. The images can be stitched by the image capturing device 102. Alternatively, the images can be stitched by the processing unit 106. The stitched images are also stored in the storage module 104. A software algorithm running on the processing unit 106 extracts information from the first set of images and separates out the metal part, gemstones and the prongs of the jewelry item using an edge detection methodology at step 210. The algorithm creates a point-to-point or line diagram of the complete jewelry item including prongs and the facet structure at step 212 and separates out the various parts. The edge detection methodology is well known in the art and will not be discussed here in detail for the purpose of brevity of the subject. It should, however, be understood to a person skilled in the art that any other known technology can be used to separate the various parts of the jewelry item. The algorithm extracts one or more of the following information from the first set of images at step 214:

Metal part dimensions, volume, angle, color and weight
Metal quality/caratage
Nicks, scratches, dents, cracks on the metal part or gemstones
Inclusions in the gemstones Identification markings or inscriptions on the metal part and gemstones Table facet structure and girdle structure of gemstones Angle and height of gemstones Pavilion depth and angle Crown height and angle Weight and color of the gemstones Coverage of the gemstone surface area, i.e., is it too short (near edge) or too high (towards table) or correct distance Distance between the prongs How the prongs are placed in respect to one another and in respect to the gemstones Height and thickness of the prongs Facet structure and angles of the prongs Angle of curvature of the prong and its angle (facing others) compared to other prongs How high the gemstone is set in comparison to the prongs and to the other gemstones relatively Size and quality of any gemstone fallen or needs to be replaced Placement of the gemstones in relation to the prongs Are the gems overlapping each other or too near?

Are the prongs touching the gem or not secure?

Check size and shape of prongs next to it and around it and other areas. Are they same or for similar gems sizes and types?

Are the Prongs of same type? How many types? How many of each type?

The information mentioned above is exemplary and should not limit the scope of the invention. It should be clearly understood that the algorithm can extract any other information from the first set of images required for verification of the jewelry item.

The frontal view of a jewelry item 400 is illustrated in FIG. 4. The algorithm calculates the dimensions of various parts from the image of the jewelry item 400. Exemplary dimensions include girdle and table facet of gemstone and placement (408), angle of prong when bent and color recognition and/or outline of tips and sides and height of prong (410), thickness of prong & angle of bending from side view (412), volume and point to point marking to check for changes (414) and facial recognition of the ring using prongs, facet placement and inclusions etc. as markers (416).

Figure 6:
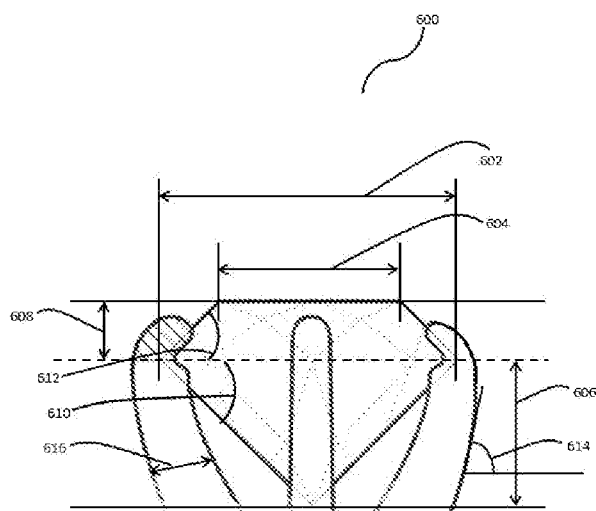
FIG. 6 illustrates a line diagram of the jewelry item.

FIG. 6 illustrates a line diagram of a jewelry item 600 created by the processing unit 106 from the first set of images. Some of the exemplary dimensions calculated from the line diagram include girdle diameter (602), table diameter (604), pavilion depth (606), crown height (608), pavilion angle (610) and crown angle (612) of the gemstone, angle of prong (614) and width of prong (616).

At step 216, the images, diagrams and extracted information is stored in the storage module 104. At step 218, a second set of images are captured at time interval T2 by the image capturing device 102. In a preferred embodiment of the present invention, the time interval T2 is the time when the jewelry item is returned from the jeweler after repairment. The time T2 can also be any arbitrary time at which the images of jewelry item are captured and stored for reference, for example, to check for wear and tear in the jewelry item. Similar steps were followed for second set of images as for the first set of images to separate the metal part, gemstones and prongs and extract the information from images at step 220. The second set of images, diagrams and extracted information are also stored in the storage module 104.

In an alternative embodiment of the present invention, the different set of images of the jewelry item can be captured at regular intervals of time to check for wear and tear and changes in the metal part and gemstones. These set of images can act as DNA map of the jewelry item to identify the changes happened in due course of time. The image data along with a passkey is passed along to the next owner/handler of the jewelry item. Updates to the item or verification of the item (re-check) for any changes made between first photo and receipt of physical delivery can be carried out before acceptance of the item using new photos and running the application to verify authenticity. If the old photo and new photo match and acceptance finalized, the passkey can be updated with the new ownership. These images can be provided to insurance companies, police, pawn shops and prospective buyers, etc. They can also get passkey from the user of jewelry item so that they can verify the authenticity, chain of ownership and accurate breakdown of the constituent products. The matching prongs and gemstone verification can allow the buyers to pay or value the metal part and gemstones much closer and more accurately. It can also let police and insurance companies to search the database if lost or stolen jewelry items are found. It further gives pawn shops or money lenders a better idea to ownership so that they have less risk while accepting to pawn the item. If a manufacturer makes multiple piece of the same jewelry item, it enables him to keep track of all the individual pieces accurately.

Figure 7A:
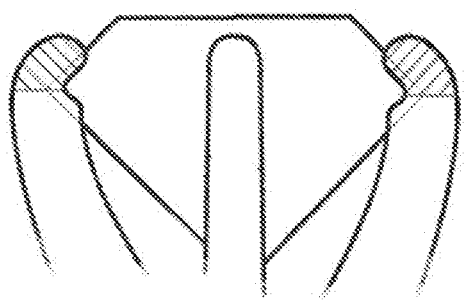
FIG. 7a illustrates a line diagram of the jewelry item at a time interval T1.
Figure 7B:
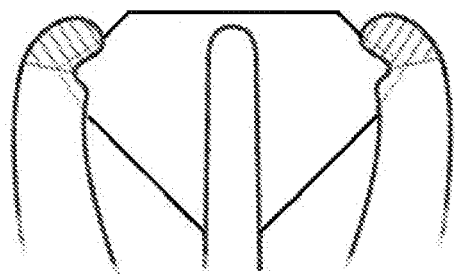
FIG. 7b illustrates a line diagram of the jewelry item at a time interval T1.

The first set and second set of images and the line diagrams created from the images are superimposed at step 222 to verify a change in the images between the time interval T1 and T2. FIGS. 7*a* and 7*b* illustrates the line diagrams the jewelry item created from first and second set of images, respectively. FIG. 7*c* shows the superimposed image of FIGS. 7*a* and 7*b* to verify changes in the prongs settings of the jewelry item at step 224. For example, the changes in distance between the prongs, height and thickness of the prongs, position of prongs with respect to the gemstones, angle of curvature of the prongs and its angle compared to other prongs, prong to prong height and seat size ratios, etc. It should be clearly understood that the above mentioned parameters are exemplary and the algorithm can take into account various other parameters required for verifying the changes in prong settings. The algorithm calculates these changes on pixel-to-pixel basis from the superimposed image and displays all the changes on the output system 110. The algorithm checks if the changes are within a predefined threshold limit at step 226 and generates an alert or a flag if any of the change is more than the threshold limit at step 228. Based on the changes in the prongs, the algorithm calculates the changes in metal part and gemstones of the jewelry item at step 230. For example, changes in dimensions of the gemstone (crown height, pavilion depth, table diameter, pavilion angle, crown angle, etc.), size and volume of the metal part, etc. This enables the user to know what changes have been done to the jewelry item during repair and whether these changes are within the acceptable limit. In an exemplary embodiment, if the gemstone needs to be replaced in the jewelry item, the user can verify from the output information if the replaced gemstone matches the value and size of the previous gemstone. If the size varies more than an algorithmic value, question can be raised to the jeweler who replaced the gemstone. If the algorithm includes the capability of automatic appraisal of the jewelry item, it evaluates the valuation of the jewelry item at time interval T2 and displays it to the user at step 232 on the output system 110. This enables the user to compare the valuation of jewelry item at time T2 with the known valuation at time T1. The process stops at step 234.

FIG. 8a illustrates a line diagram of the jewelry item with gemstone removed from the prongs at time interval T1. The software algorithm running on the processing unit 106 calculates the distance between the prongs 802, width of the prong 804 and angle of curvature of the prong 806. The algorithm can also estimate the size and weight of a gemstone which can be best fitted between the prongs. The calculated values are stored in the storage module 104. In an exemplary embodiment, the images of jewelry item, the line diagram 800 and the calculated values are sent to a jeweler to know if the jeweler has the gemstone of required size and weight. If the required gemstone is available in stock, the jeweler sends the image of the gemstone to the user for reference. The jewelry item is then sent to a jeweler for setting the gemstone between the prongs. The jewelry item is received from the jeweler with fitted gemstone and its images are again captured. FIG. 8b illustrates a line diagram of the jewelry item at time interval T2 after a gemstone is set between the prongs. The software algorithm again calculates the distance between the prongs 812, width of the prong 814 and angle of curvature of the prong 816. The calculated values are stored in the storage module 104. The algorithm calculates the difference between the corresponding stored values to verify the changes and displays it on the output system 110. An alert or a flag is generated if the difference is more than predefined values (considering wear and tear during setting of the gemstone). In such a scenario, the user can question the jeweler to verify for the fitted gemstone and the loss of metal part.

Figures 9A, 9B:
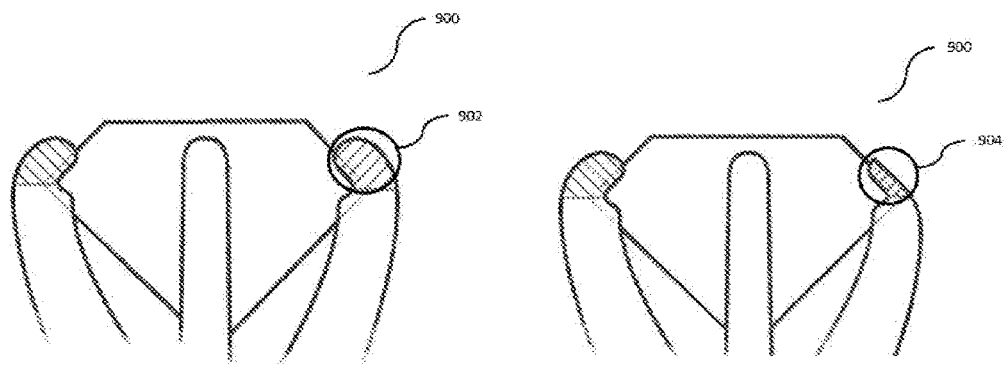
FIGS. 9a and 9b illustrates the line diagrams of the jewelry item with different prong size at time interval T1 and T2, respectively.

FIGS. 9a and 9b illustrates the line diagrams of a jewelry item 900 at time interval T1 and T2, respectively. The prong size 904 has been changed at time interval T2 when the jewelry item is received from the jeweler after repairment. The software algorithm calculates the difference between the prong sizes 902 and 904 and generates an alert accordingly.

Figure 10:
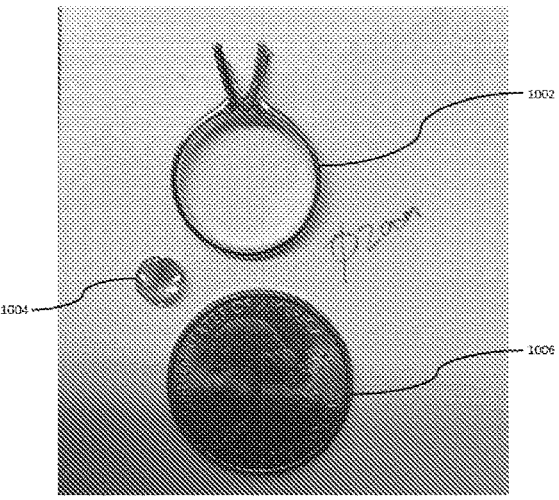
FIG. 10 shows an image of a ring, a gemstone and a standard size coin.

In an alternative embodiment, the user has the gemstone to be fitted in the jewelry item. The user clicks an image of the jewelry item and the gemstone along with an object of standard size (for example coin). This enables the user to know the actual size of the jewelry item and the gemstone, irrespective of the image zoom size, by comparing it with the standard size of the coin. FIG. 10 shows an image of a ring 1002, a gemstone 1004 and a standard size coin 1006. The actual size of ring 1002 and the gemstone 1004 can be easily known by comparing it with coin 1006. The software algorithm running on the processing unit 106 also extracts the information of inclusions in the gemstone 1004 and identification markings on the ring 1002 and gemstone 1004 (if any). The algorithm compares the information to verify the changes in the ring 1002 and the gemstone 1004 between the time intervals T1 and T2.

In a further embodiment, the present invention provides a security in buying a jewelry item through an e-commerce platform. The e-commerce platform can provide 360° images of the jewelry items to a buyer including the gemstones, metal part and the prongs. The buyer can store the images in the storage module 104 and process it using the software algorithm running on the processing unit 106. The algorithm extracts all the information from the images and stores in the storage module 104. After the actual receipt of the jewelry item by the buyer, the images are again captured and information is extracted by the algorithm. The extracted information is compared with the stored information to verify if the same jewelry item is received. This helps to detect any fraud by the company of e-commerce platform or during the transit of the jewelry item.

Figure 11A:
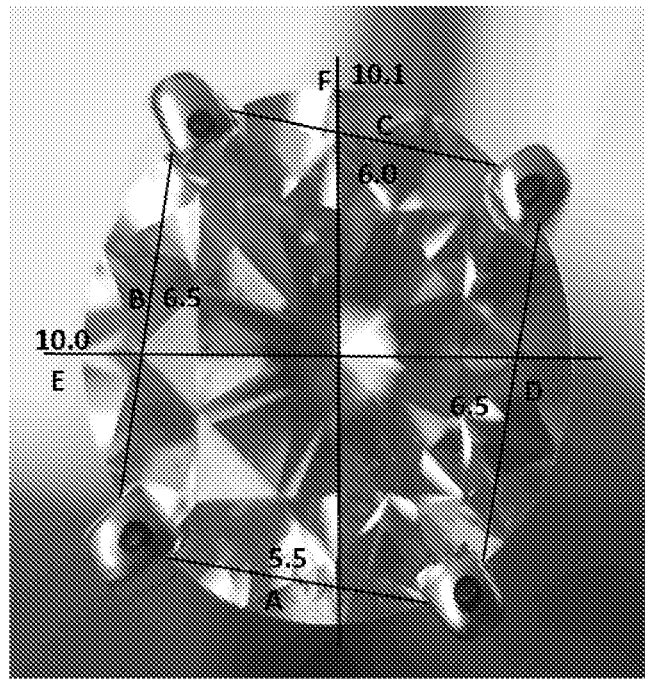
FIG. 11a illustrates the top view of the jewelry item with an initial set gemstone.
Figure 11B:
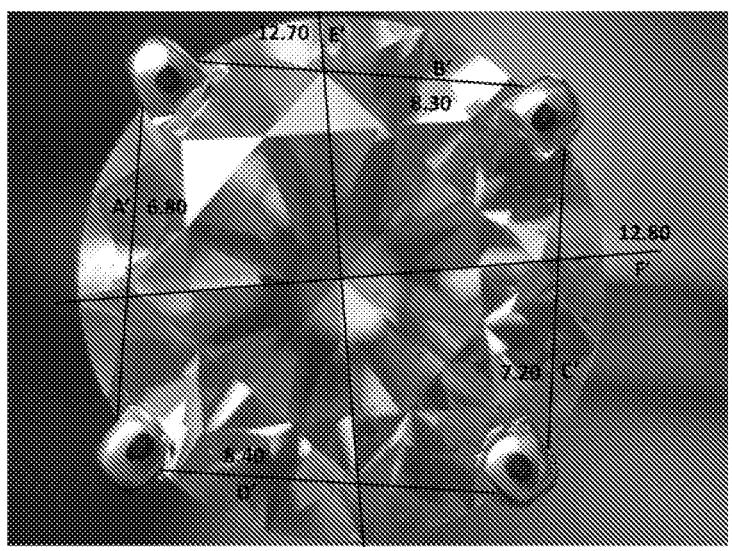
FIG. 11b illustrates the top view of the jewelry item with the same gemstone reset in the jewelry item.

FIG. 11a illustrates the top view of a jewelry item with an initial set gemstone. FIG. 11b illustrates the top view of the jewelry item with the same gemstone reset in the jewelry item. The FIGS. 11a and 11b shows various dimensions of the gemstone and the prongs. The tips of the prongs have also been changed before and after reset of the diamond as shown in FIGS. 11a and 11b. It should be noted that the figures are for illustrative purpose and are not drawn to scale.

Diamond size (as obtained from diamond lab report)—6.36-6.39×4.13 mm

Ratio of the diamond size=6.36/6.39=0.995305

Ratio of the lines passing through the diagonal of the gemstone:

$E'/E = 12.70/10.00 = 1.27$ $F'/F = 12.80/10.10 = 1.267$

Calculating the percentage difference between the calculated values and diamond size 12.80×0.995305=12.734

Percentage (%) error=(12.80−12.734)/12.80×100=0.549<1%

Therefore, the deviation in the prong setting will be acceptable if the difference in corresponding values of FIGS. 11a and 11b is less than 1%.

Considering the prong to prong distance in FIG. 11a $A: 5.55 \times (1.27, 1.267) = \text{Average}(7.0485, 7.03185)$
$\pm 1\% = 6.969$     1.

$B: 6.50 \times (1.27, 1.267) = \text{Average}(8.255, 8.2355)$
$\pm 1\% = 8.327$     2.

$C: 6.00 \times (1.27, 1.267) = \text{Average}(7.62, 7.602) \pm 1\% = 7.687$     3.

$D: 6.50 \times (1.27, 1.267) = \text{Average}(8.255, 8.2355)$
$\pm 1\% = 8.327$     4.

Comparing the calculated values from the above equations 1, 2, 3, 4 with the prong to prong distance in FIG. 11b $A': (6.80-6.969)/6.80 \times 100 = 2.49\%$ (not acceptable value greater than 1%)     1.

$B': (8.30-8.327)/8.30 \times 100 = 0.333\%$ (acceptable value less than 1%)     2.

$C': (7.20-7.687)/7.20 \times 100 = 6.765\%$ (not acceptable value greater than 1%)     3.

$D': (8.40-8.327)/8.40 \times 100 = -0.860\%$ (acceptable value less than 1%)     4.

In general, 2 prongs are needed to be opened to remove the gemstone from the jewelry item. The percentage change in the prong to prong distance after resetting can conclude which prongs were opened during repairment. For the calculated values which have more than 1% deviation in the above equations, the software algorithm running on processing unit 106 will generate an alert or a flag which will be displayed on the output system 110.

Figure 3:
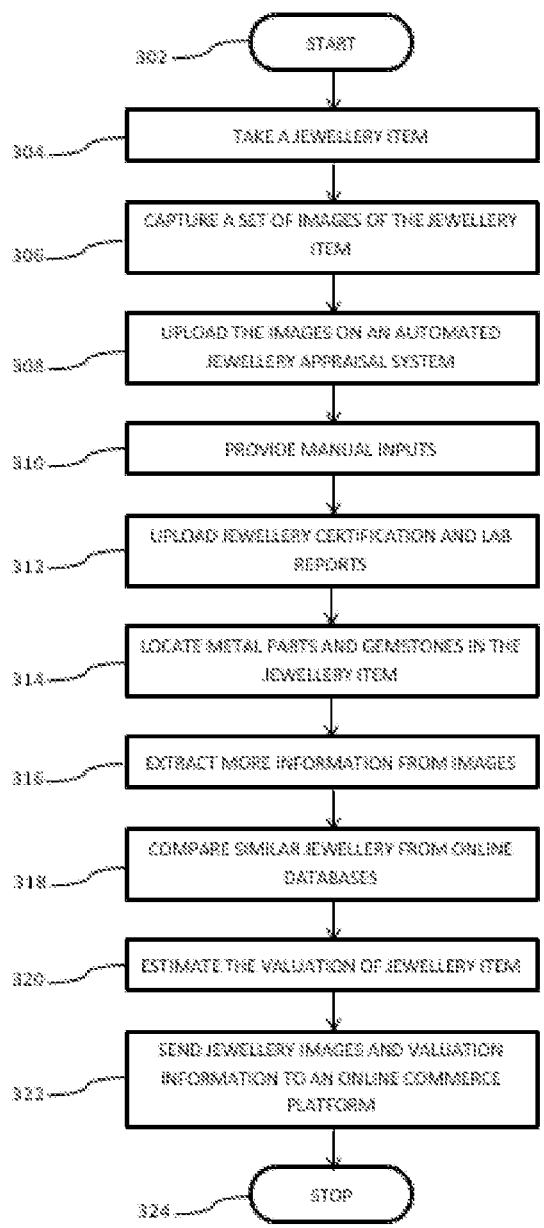
FIG. 3 illustrates a flowchart showing steps for online appraisal of the jewelry item.

FIG. 3 illustrates a flowchart showing steps for online appraisal of the jewelry item. The process starts at step 302 and a jewelry item is taken at step 304. A set of images of the jewelry item are captured using the image capturing device at step 306. The images are captured along with an object of standard dimensions, like a coin of standard size. This enables to calculate the exact size of the jewelry item and the angle of picture taken irrespective of the zoom view of the image. The set of images capture a complete view of the jewelry item. At step 308, the captured images are uploaded on an automated jewelry appraisal system. The automated jewelry appraisal system can be a software application running on a server computer, a client user computer, a mobile phone, a control system and a network router, switch or bridge. Alternatively, the software application can be running on a virtual computing system of a cloud environment. At step 310, the user can provide manual inputs in the automated jewelry appraisal system. For example, the user can input physical characteristics of the metal part and the gemstones like weight, volume, dimensions, carat, cut grade, color rating, etc. The user can also upload jewelry certification and lab reports at step 312 obtained from jewelry certification organizations like Gemological Institute of America, The International Gemological Institute, European, Gemological Laboratory, etc. At step 314, the software application automatically detects the metal parts and the gemstones in the jewelry item. The software application can use, for example, edge detection technology or any other methodology to create a point-to-point diagram or a line-wire diagram of the jewelry item. At step 316, the software application extract more information from the images, like size, weight, carat, color grade, clarity, cut proportions, polish, etc. The automated jewelry appraisal system access different online jewelry databases or websites, like zeales, Kitco, etc. to find jewelry items and gemstones with similar parameters, like color grade, prong styles, type of metal, design styles, etc. The data and valuation of these similar jewelry items is received and compared with the user jewelry item at step 318. The software application then estimate the valuation of the jewelry item at step 320 based on all the extracted information. At step 322, the gemstone or jewelry images and valuation is sent to an online commerce platform for displaying and selling the jewelry item. The process stops at step 324.

Figure 12A:
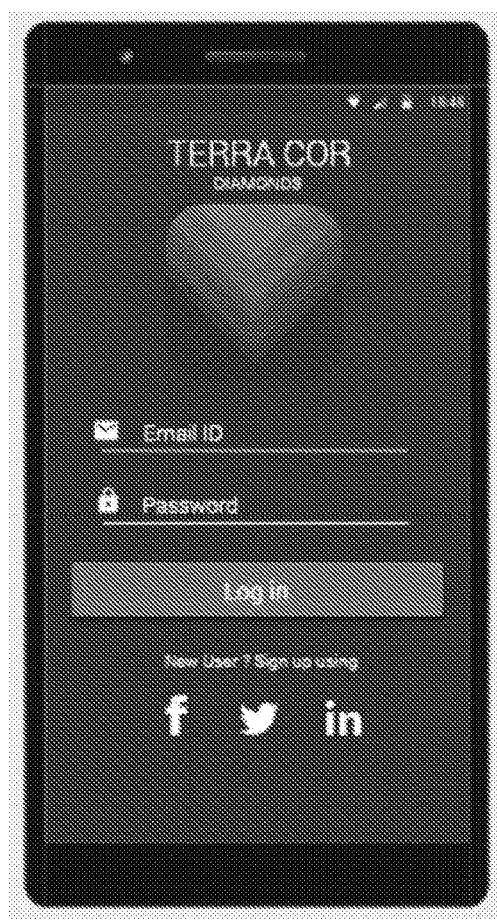
FIGS. 12a, 12b, 12c, 12d, 12e, 12f, 12g and 12h illustrates an exemplary mobile application of an online commerce platform for buying and selling the jewelry items.
Figure 12B:
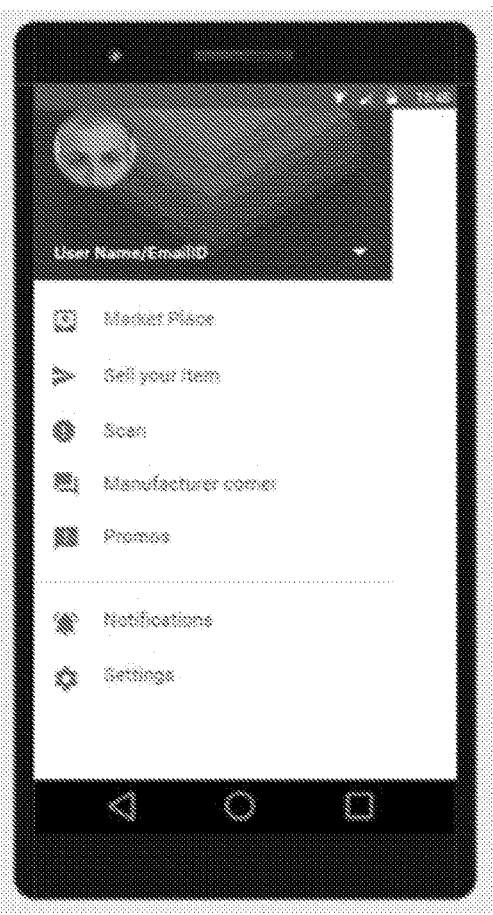
Figure 12C:
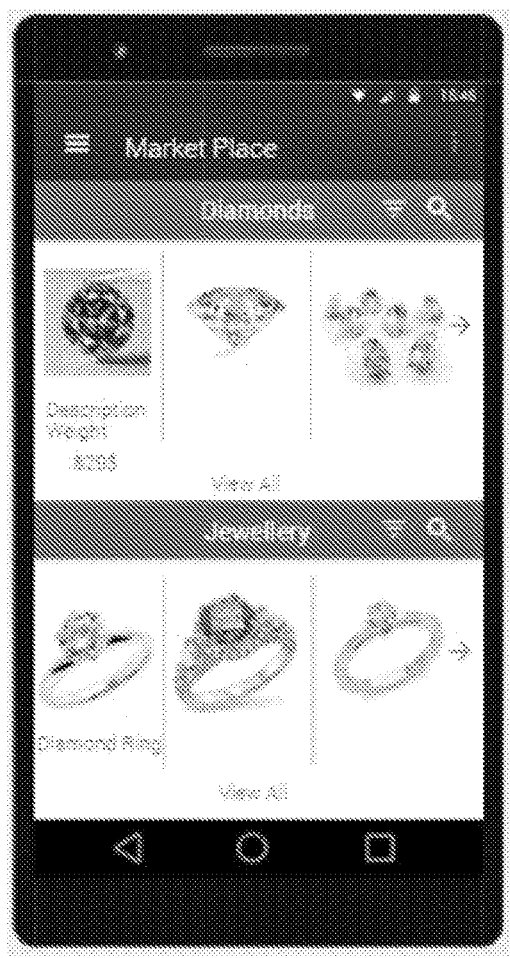
Figure 12D:
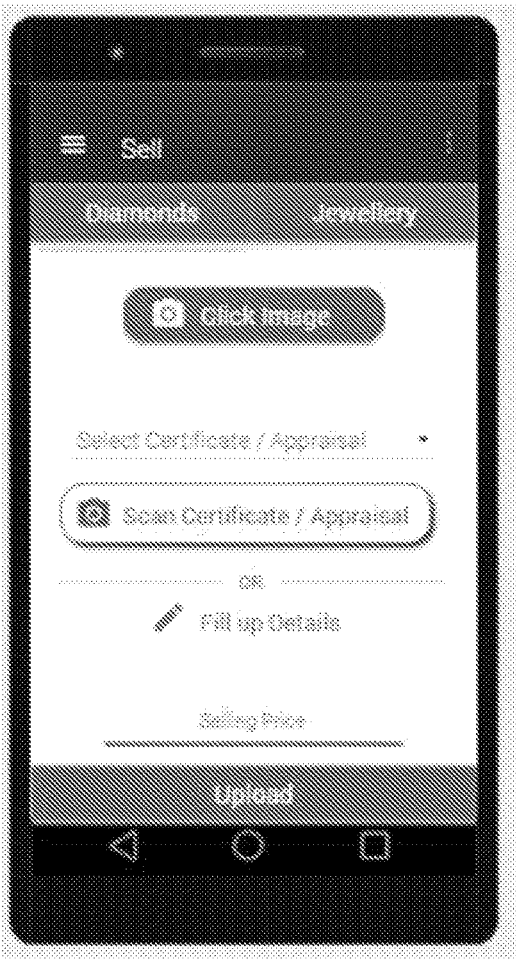
Figure 12E:
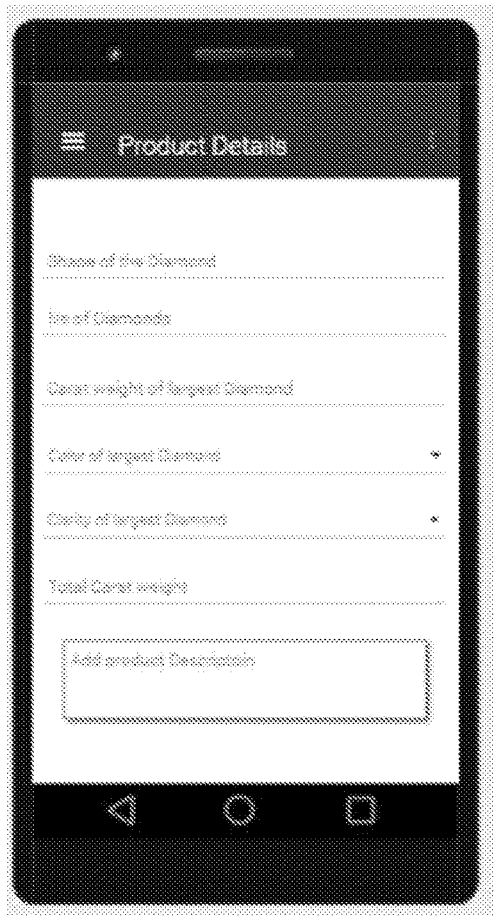
Figure 12F:
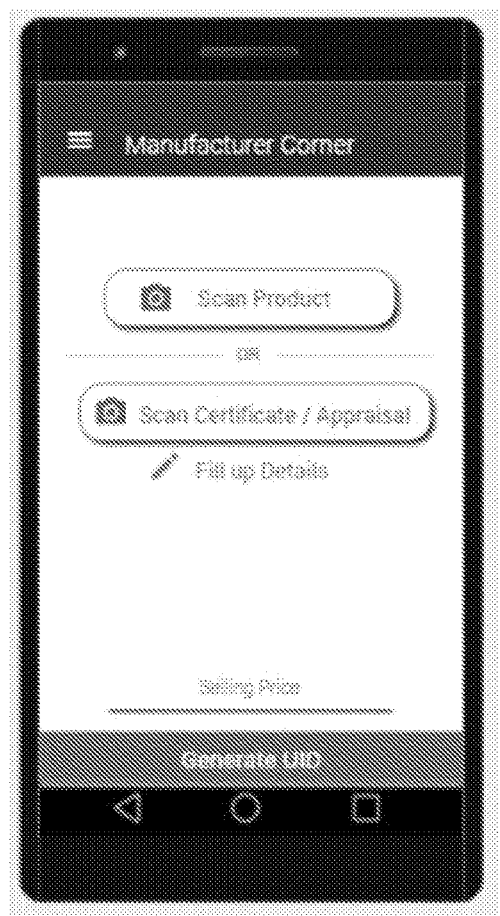
Figure 12G:
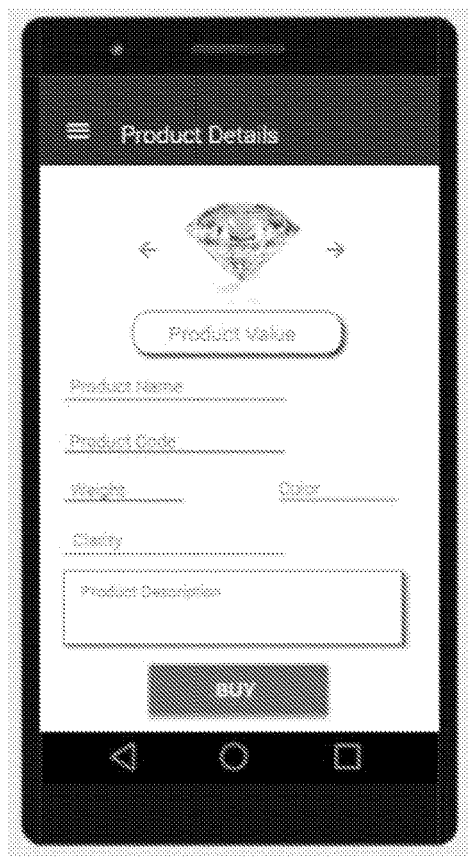
Figure 12H:

FIGS. 12*a*, 12*b*, 12*c*, 12*d*, 12*e*, 12*f*, 12*g* and 12*h* illustrates an exemplary mobile application of an online commerce platform for buying and selling jewelry items. A buyer or a seller of the jewelry item can create his/her profile in the mobile application and can login with the credentials as shown in FIG. 12*a*. The platform provides various functionalities to the buyer or seller like a 'marketplace' to buy gemstones and jewelry items available from different sellers, "sell your item" to sell its own gemstones and jewelry items, 'scan' to upload the images and lab certificates of the gemstones and jewelry items, etc. as shown in FIG. 12*b*. FIG. 12*c* shows a marketplace of the online commerce platform where the buyer or seller can view the details and pricing of the diamonds and jewelry items placed by different sellers on the platform. FIG. 12*d* shows the functionality of selling diamonds and jewelry items by clicking and uploading its images. The seller can also scan and upload certificates and appraisal reports provided by jewelry certification organizations like Gemological Institute of America, etc. The selling price of the item can also be inputted by the seller. FIG. 12*e* shows a user interface for inputting the product details for placing the product on the platform for selling. FIG. 12*f* shows a manufacturer corner for scanning and uploading certificates and appraisal reports by the manufacturer of the product. FIG. 12*g* shows the functionality of buying a product from the online commerce platform. On selecting an available product, the buyer can see all the product details and can buy the product. The buyer or seller can also scan or input a product code of the jewelry item or gemstone to find the product information such as price comparisons and user reviews of similar products available online on the platform as shown in FIG. 12*h*.

What is claimed is:

1. A method for verification of a jewelry item, the method comprising:

capturing, using an image capture device, a first set of images of the jewelry item at a first time interval, wherein the first set of images captures an image of one or more gem holders, wherein the one or more gem holders enable one or more gemstones to be held on the jewelry item, wherein the first set of images comprises one or more of a still image, a video image and a laser based topography model of the jewelry item;

capturing, using the image capture device, a second set of images of the jewelry item at a second time interval, wherein the second set of images captures the image of the one or more gem holders, wherein the second set of images comprises one or more of a still image, a video image and a laser based topography model of the jewelry item;

processing, by a computing device configured by executing a software program, the first and second sets of images, respectively, to extract physical characteristics of the one or more gem holders, wherein the physical characteristics include a setting of the one or more gem holders;

comparing, by the computing device, at least the setting of the one or more gem holders depicted in the first set of images and the second set of images to identify a change in the setting of the one or more gem holders, wherein the comparing step comprises calculating a difference between the physical characteristics of the one or more gem holders extracted from the first and second sets of images, respectively; and displaying, by the computing device, the results of comparison of the first set of images and the second set of images.

2. The method of claim 1, wherein comparing the first set of images and the second set of images further comprises verifying a change in a size or a position of the one or more gemstones based on the change in the setting of the one or more gem holders.

3. The method of claim 1, wherein capturing the first set of images and the second set of images of the jewelry item further comprises capturing an image of one or more of an inclusion, girdle and faceting of the one or more gemstones.

4. The method of claim 1, wherein capturing the first set of images and the second set of images of the jewelry item further comprises capturing an image of an inscription on one or more of a metal part and the one or more gemstones of the jewelry item.

5. The method of claim 1 further comprises generating an alert if a change is verified in the setting of the one or more gem holders.

6. The method of claim 1, further comprising storing a physical identification data of the metal part and the one or more gemstones of the jewelry item in a database or website.

7. The method of claim 1, further comprises storing a time stamp and a location of capturing of the first set of images and the second set of images in a database, wherein the time stamp comprises the date and time of capturing and storing the images.

8. The method of claim 1, wherein the step of processing a given set of images among the first and second sets of images comprises: stitching together the images in the given set to create a combined image of the jewelry item.

9. The method of claim 1, wherein the physical characteristics include dimensions of the one or more gem holders.

10. A method for verifying a change in the valuation of a jewelry item, the method comprising:

capturing, using an image capture device, a first set of images of the jewelry item at first time interval, wherein the first set of images captures an image of one or more gem holders, wherein the one or more gem holders enable one or more gemstones to be held on the jewelry item, wherein the first set of images comprises one or more of a still image, a video image and a laser based topography model of the jewelry item;

storing the first set of images in a database;

capturing, using an image capture device, a second set of images of the jewelry item at second time interval, wherein the second set of images captures the image of the one or more gem holders, wherein the second set of images comprises one or more of a still image, a video image and a laser based topography model of the jewelry item;

storing the second set of images in the database;

processing, by a computing device configured by executing a software program, the first and second sets of images, respectively, to extract physical characteristics of the one or more gem holders, wherein the physical characteristics include a setting of the one or more gem holders;

comparing, at least the setting of the one or more gem holders depicted in the first set of images and the second set of images to verify a change in a setting of the one or more gem holders, wherein the comparing step comprises calculating a difference between the physical characteristics of the one or more gem holders extracted from the first and second sets of images, respectively;

verifying a change in a metal part or the one or more gemstones of the jewelry item based on the change in the setting of the one or more gem holders;

verifying a change in a valuation of the jewelry item based on the change in the metal part or the one or more gemstones; and generating an alert if a change is verified in the setting of the one or more gem holders.

11. The method of claim 10, wherein the images in the first set of images and in the second set of images comprise one or more of a still image, a video image and a laserbased topography model of the jewelry item.

12. The method of claim 10, wherein capturing the first set of images and the second set of images of the jewelry item further comprises capturing an image of one or more of an inclusion, girdle and faceting of the one or more gemstones.

13. The method of claim 10, wherein capturing the first set of images and the second set of images of the jewelry item further comprises capturing an image of an inscription on one or more of a metal part and the one or more gemstones of the jewelry item.

14. The method of claim 10, wherein the database is connected to an automated jewelry appraisal system, wherein the automated jewelry appraisal system estimates, by a computing device configured by executing a software application, a first valuation at the first time interval and a second valuation at the second time interval of the jewelry item using the first set of images and the second set of images, respectively.

15. The method of claim 14 further comprises storing the first valuation and the second valuation in the database.

16. The method of claim 14, wherein the change in valuation of the jewelry item is calculated based on the difference between the first valuation and the second valuation.

17. The method of claim 10, wherein the database is connected to an online commerce platform, wherein the online commerce platform enables a consumer to perform one or more functionalities of displaying, evaluating, comparing and selling the jewelry item.

18. The method of claim 10 further comprises storing physical identification data of the metal part and the one or more gemstones of the jewelry item in the database.

19. The method of claim 10 further comprises storing a time stamp of the first set of images and the second set of images in the database, wherein the time stamp comprises the date and time of capturing and storing the images.

20. A system for verification of a jewelry item, the system comprising:

an image capturing device for capturing a first set of images and a second set of images of the jewelry item at first and second time interval, respectively, wherein the first set of images and the second set of images captures an image of one or more gem holders, wherein the one or more gem holders enable one or more gemstones to be held on the jewelry item, and wherein the first set of images comprises one or more of a still image, a video image and a laser based topography model of the jewelry item;

a database for storing the first set of images and the second set of images;

a processing unit configured to process the first and second sets of images, respectively, to extract physical characteristics of the one or more gem holders, wherein the physical characteristics include a setting of the one or more gem holders, and wherein the processing unit is further configured to compare at least the setting of the one or more gem holders depicted in the first set of images and the second set of images to identify a change in a setting of the one or more gem holders, wherein the comparison is performed by calculating a difference between the physical characteristics of the one or more gem holders extracted from the first and second sets of images, respectively; and an output display for:
  displaying the first set of images and the second set of images; and
  displaying the results of comparison of the first set of images and the second set of images.

21. The system of claim 20, wherein the image capturing device captures one or more of a still image, a video image and a laser based topography model of the jewelry item.

22. The system of claim 20, wherein the database further stores one or more of an image of an inclusion, girdle and faceting of the one or more gemstones, an image of an inscription on a metal part and the one or more gemstones and a physical identification data of the metal part and the one or more gemstones.

23. The system of claim 20, wherein the database further stores a time stamp of the first set of images and the second set of images in the database, wherein the time stamp comprises the date and time of capturing and storing the images.

24. The system of claim 20, further comprising an automated jewelry appraisal system, wherein the jewelry appraisal system estimates, by a computing device configured by executing a software application, the valuation of the jewelry item using the stored images.

25. The system of claim 20, further comprising an online commerce platform, wherein the online commerce platform enables a consumer to perform one or more functionalities of displaying, evaluating, comparing and selling the jewelry item.

26. A non-transitory computer-readable storage medium, having stored there on a computer program for verification of a jewelry item, the computer program having a plurality of code sections, the code sections executable by a computer to cause the computer to perform the steps of:

receiving a first set of images of the jewelry item captured using an image capture device at a first time interval, wherein the first set of images includes an image of one or more gem holders, wherein the one or more gem holders enable one or more gemstones to be held on the jewelry item, and wherein the first set of images comprises one or more of a still image, a video image and a laser based topography model of the jewelry item;

receiving a second set of images of the jewelry item captured using an image capture device at a second time interval, wherein the second set of images includes the image of the one or more gem holders and wherein the second set of images comprises one or more of a still image, a video image and a laser based topography model of the jewelry item; and processing, by the computer configured by executing the computer program, the first and second sets of images, respectively, to extract physical characteristics of the one or more gem holders, wherein the physical characteristics include a setting of the one or more gem holders;

comparing, by the computing device, at least the setting of the one or more gem holders depicted in the first set of images and the second set of images to identify a change in the setting of the one or more gem holders, wherein the comparing step comprises calculating a difference between the physical characteristics of the one or more gem holders extracted from the first and second sets of images, respectively; and displaying, by the computing device, the results of comparison of the First set of images and the second set of images.

27. The non-transitory computer-readable storage medium of claim 26, wherein the first set of images and the second set of images comprises one or more of a still image, a video image and a laser based topography model of the jewelry item.

28. The non-transitory computer-readable storage medium of claim 26, wherein comparing the first set of images and the second set of images further comprises code sections for verifying a change in a size or a position of the one or more gemstones based on the change in the setting of the one or more gem holders.

29. The non-transitory computer-readable storage medium of claim 26, wherein receiving the first set of images and the second set of images of the jewelry item further comprises code sections for receiving an image of an inclusion in the one or more gemstones.

30. The non-transitory computer-readable storage medium of claim 26, wherein receiving the first set of images and the second set of images of the jewelry item further comprises code sections for receiving an image of an inscription on one or more of a metal part and the one or more gemstones of the jewelry item.

31. The non-transitory computer-readable storage medium of claim 26 further comprises code sections for generating an alert if a change is verified in the setting of the one or more gem holders.

32. The non-transitory computer-readable storage medium of claim 26 further comprises code sections for storing the first set of images and the second set of images.

33. The non-transitory computer-readable storage medium of claim 26 further comprises code sections for storing a physical identification data of the metal part and the one or more gemstones of the jewelry item.

34. The non-transitory computer-readable storage medium of claim 26 further comprises code sections for storing a time stamp of the first set of images and the second set of images in the database, wherein the time stamp comprises the date and time of capturing and storing the images.

35. A method for verification of a jewelry item, the method comprising:

capturing, using an image capture device, a first set of images of the jewelry item at a first time interval, wherein the first set of images captures an image of one or more gem holders, wherein the one or more gem holders enable one or more gemstones to be held on the jewelry item, wherein the first set of images comprises one or more of a still image, a video image and a laser based topography model of the jewelry item;

capturing, using the image capture device, a second set of images of the jewelry item at a second time interval, wherein the second set of images captures the image of the one or more gem holders, wherein the second set of images comprises one or more of a still image, a video image and a laser based topography model of the jewelry item;

processing, by a computing device configured by executing a software program, the first and second sets of images, respectively, to extract physical characteristics of the one or more gem holders, wherein the physical characteristics include a setting of the one or more gem holders, and wherein the step of processing a given set of images among the first and second sets of images comprises:

generating a diagram of the jewelry item from the given set of images, wherein the diagram is one or more of a point-to-point diagram and a line diagram, and wherein the respective physical characteristics of the jewelry item, including the gem holder and the one or more gemstones, are calculated from the generated diagram;

comparing, by the computing device, at least the setting of the one or more gem holders depicted in the first set of images and the second set of images to identify a change in the setting of the one or more gem holders; and displaying, by the computing device, the results of comparison of the first set of images and the second set of images.

36. The method of claim 25, wherein the comparing step comprises:

superimposing the diagram generated from the first set of images over the diagram generated from the second set of images; and calculating the change in the setting based on the superimposed diagrams using a pixel-to-pixel comparison methodology.

37. A method for verification of a jewelry item, the method comprising:
- capturing, using an image capture device, a first set of images of the jewelry item at a first time interval, wherein the first set of images captures an image of one or more gem holders, wherein the one or more gem holders enable one or more gemstones to be held on the jewelry item, wherein the first set of images comprises one or more of a still image, a video image and a laser based topography model of the jewelry item;
- capturing, using the image capture device, a second set of images of the jewelry item at a second time interval, wherein the second set of images captures the image of the one or more gem holders, wherein the second set of images comprises one or more of a still image, a video image and a laser based topography model of the jewelry item;
- processing, by a computing device configured by executing a software program, the first and second sets of images, respectively, to extract physical characteristics of the one or more gem holders, wherein the physical characteristics include a setting of the one or more gem holders, and wherein the step of processing a given set of images among the first and second sets of images comprises: separating out the one or more gem holders and the one or more gemstones of the jewelry item using an edge detection image processing methodology;
- comparing, by the computing device, at least the setting of the one or more gem holders depicted in the first set of images and the second set of images to identify a change in the setting of the one or more gem holders; and
- displaying, by the computing device, the results of comparison of the first set of images and the second set of images.

* * * * *